(12) United States Patent
Carruba

(10) Patent No.: US 10,359,220 B2
(45) Date of Patent: Jul. 23, 2019

(54) SYSTEMS, METHODS AND APPARATUS FOR SERVICING A REFRIGERATION SYSTEM

(75) Inventor: Vincent Carruba, Baldwin, NY (US)

(73) Assignee: The Armor All/STP Products Company, Danbury, CT (US)

(*) Notice: Subject to any disclaimer, the term of this patent is extended or adjusted under 35 U.S.C. 154(b) by 0 days.

(21) Appl. No.: 13/365,012

(22) Filed: Feb. 2, 2012

(65) Prior Publication Data

US 2012/0192576 A1 Aug. 2, 2012

Related U.S. Application Data

(60) Provisional application No. 61/438,819, filed on Feb. 2, 2011, provisional application No. 61/438,823, filed on Feb. 2, 2011.

(51) Int. Cl.
*F25B 45/00* (2006.01)
*B60H 1/00* (2006.01)

(52) U.S. Cl.
CPC ......... *F25B 45/00* (2013.01); *B60H 1/00585* (2013.01); *F17C 2205/0382* (2013.01); *F25B 2345/001* (2013.01); *F25B 2345/006* (2013.01)

(58) Field of Classification Search
CPC ......... F17C 2205/0382; B60H 1/00585; F25B 45/00; F25B 2345/006; F25B 2345/001
USPC ........................... 62/77, 149, 292; 222/153.2
See application file for complete search history.

(56) References Cited

U.S. PATENT DOCUMENTS

| | | |
|---|---|---|
| 1,420,997 A | 6/1922 | Freeman |
| 1,666,283 A | 4/1928 | Farley |
| 1,799,727 A | 4/1931 | Byars |
| 2,001,233 A | 5/1935 | Anderberg |
| 2,040,868 A | 5/1936 | Moody |
| 2,285,569 A | 6/1942 | Crowley |
| 2,635,623 A | 4/1953 | Moffett |
| 3,131,733 A | 5/1964 | Monahon |
| 3,252,475 A * | 5/1966 | Jones ..................... F16L 41/065 137/318 |
| 3,448,779 A | 6/1969 | Horwitt |
| 3,452,906 A | 7/1969 | Daniels |
| 3,717,008 A * | 2/1973 | Bandy ............................ 62/292 |
| 3,759,291 A * | 9/1973 | Moore et al. ................. 137/588 |
| 3,907,012 A | 9/1975 | Burke |

(Continued)

OTHER PUBLICATIONS

Co-pending U.S. Appl. No. 13/365,006 entitled "Servicing Devices and Methods of Use Thereof," available in PAIR.

(Continued)

*Primary Examiner* — Frantz F Jules
*Assistant Examiner* — Martha Tadesse
(74) *Attorney, Agent, or Firm* — Kagan Binder, PLLC

(57) ABSTRACT

Systems, methods and apparatuses for servicing a refrigeration system are described herein. A system may include a fluid source and a device is capable of coupling to the fluid source, a measuring device and a fluid receiving system. The device may include a valve disposed passage disposed in a body of the apparatus that communicates with the fluid source, the measuring device and the fluid receiving system. A portion of the valve being engageable with a self-sealing valve of the refrigerant supply while inhibiting fluid flow between the fluid source and the measuring device and/or between the measuring device and the fluid receiving system.

21 Claims, 10 Drawing Sheets

(56) References Cited

U.S. PATENT DOCUMENTS

| | | | |
|---|---|---|---|
| 3,976,110 A | 8/1976 | White | |
| 4,116,245 A | 9/1978 | Ayers | |
| 4,545,759 A * | 10/1985 | Giles | F17C 13/04 126/40 |
| 4,644,982 A | 2/1987 | Hatch | |
| 4,694,975 A * | 9/1987 | Hagan | B67D 1/0456 215/4 |
| 4,903,741 A | 2/1990 | Ibanez | |
| 4,995,417 A | 2/1991 | Naku | |
| 5,070,917 A | 12/1991 | Ferris et al. | |
| 5,248,125 A | 9/1993 | Fritch et al. | |
| 5,329,975 A | 7/1994 | Heitel | |
| 5,355,830 A | 10/1994 | deJong | |
| RE34,781 E * | 11/1994 | Spalink et al. | 137/614.05 |
| 5,609,195 A | 3/1997 | Stricklin et al. | |
| 5,626,173 A | 5/1997 | Groul | |
| 5,727,776 A * | 3/1998 | Gerstenberger | 251/368 |
| 5,967,204 A | 10/1999 | Ferris et al. | |
| 6,079,444 A | 6/2000 | Harris et al. | |
| 6,089,032 A | 7/2000 | Trachtenberg | |
| 6,296,228 B1 | 10/2001 | Knowles et al. | |
| 6,360,554 B1 | 3/2002 | Trachtenberg | |
| 6,360,795 B1 | 3/2002 | Bothe et al. | |
| 6,385,986 B1 * | 5/2002 | Ferris | B60H 1/00585 62/292 |
| 6,438,970 B1 | 8/2002 | Ferris et al. | |
| 6,442,958 B1 | 9/2002 | Knowles | |
| 6,446,453 B1 | 9/2002 | Trachtenberg | |
| 6,467,283 B1 | 10/2002 | Trachtenberg | |
| 6,481,221 B2 | 11/2002 | Ferris et al. | |
| 6,539,970 B1 * | 4/2003 | Knowles et al. | 137/238 |
| 6,539,988 B1 | 4/2003 | Cowen et al. | |
| 6,609,385 B1 * | 8/2003 | Ferris et al. | 62/77 |
| 6,648,035 B1 * | 11/2003 | Cowan | B60H 1/00585 141/329 |
| 6,698,466 B1 | 3/2004 | Cowan et al. | |
| 6,722,141 B2 | 4/2004 | Ferris et al. | |
| 6,789,581 B2 | 9/2004 | Cowen et al. | |
| 6,796,340 B1 | 9/2004 | Ferris et al. | |
| 6,898,979 B2 | 5/2005 | Cowen et al. | |
| 6,978,636 B2 | 12/2005 | Motush et al. | |
| 7,077,171 B2 | 7/2006 | Carrubba | |
| 7,107,781 B2 | 9/2006 | Quest et al. | |
| 7,124,598 B2 | 10/2006 | Quest et al. | |
| 7,260,943 B2 | 8/2007 | Carrubba et al. | |
| 7,275,383 B2 | 10/2007 | Motush et al. | |
| 7,565,829 B2 | 7/2009 | Quest et al. | |
| 7,565,830 B2 | 7/2009 | Quest et al. | |
| 7,673,497 B2 | 3/2010 | Quest et al. | |
| 8,360,119 B2 | 1/2013 | Huang et al. | |
| 9,709,307 B2 | 7/2017 | Carrubba et al. | |
| 2004/0079092 A1 | 4/2004 | Ferris et al. | |
| 2005/0217285 A1 * | 10/2005 | Carrubba | B60H 1/00585 62/149 |
| 2008/0022701 A1 | 1/2008 | Carrubba | |
| 2008/0216491 A1 * | 9/2008 | Quest | F25B 49/005 62/77 |
| 2009/0113901 A1 | 5/2009 | Carrubba | |
| 2011/0041522 A1 * | 2/2011 | Carrubba | F16K 1/308 62/77 |
| 2011/0278021 A1 * | 11/2011 | Travis et al. | 166/386 |
| 2012/0324920 A1 | 12/2012 | Carrubba | |
| 2013/0118187 A1 | 5/2013 | Carrubba | |
| 2015/0184911 A1 | 7/2015 | Pistone et al. | |
| 2015/0308879 A1 | 10/2015 | Pistone et al. | |
| 2016/0003509 A1 | 1/2016 | Pistone et al. | |
| 2017/0284716 A1 | 10/2017 | Carrubba et al. | |

OTHER PUBLICATIONS

Inter Partes Review of U.S. Pat. No. 7,260,943, Trial No. IPR2016-00441, Filing Date Jan. 15, 2016, Petition (67 pages).
Inter Partes Review of U.S. Pat. No. 7,260,943, Trial No. IPR2016-00442, Filing Date Jan. 15, 2016, Petition (67 pages).

* cited by examiner

SYSTEMS, METHODS AND APPARATUS FOR SERVICING A REFRIGERATION SYSTEM

PRIORITY CLAIM

This application claims priority to U.S. Provisional Application Ser. No. 61/438,819 entitled "VALVE TAP DEVICE AND METHODS OF USE THEREOF" to Vincent Carrubba filed Feb. 2, 2011 and U.S. Provisional Application Ser. No. 61/438,823 entitled "SYSTEMS, METHODS AND APPARATUSES FOR SERVICING A REFRIGERATION SYSTEM" to Vincent Carrubba filed Feb. 2, 2011, each of which are incorporated herein by reference.

BACKGROUND

1. Field of the Invention

Embodiments of the present invention relate to systems, methods and apparatus for fluid delivery. In particular, the present invention relates to systems, methods and apparatus for servicing a refrigeration system.

2. Description of Related Art

Many refrigeration systems, for example, automobile air conditioners, use refrigerants. The refrigerants may be added to the refrigerant system as liquids, but utilized in the system as gases. These refrigeration systems operate based on the principle of Gay-Lussac's Law, which is: P$\alpha$T or P/T=k, where k is constant and where P=pressure and T=temperature. In accordance with this law, as the pressure of a compressed gas increases, its temperature increases. Conversely, as the pressure of the gas decreases, the temperature of the gas decreases. Expansion of a refrigerant gas in a refrigerant system acts to cool the system. Air blown over the cooled system, in turn may be cooled, and provided to a vent where it can cool an interior space of a vehicle (for example, an automobile interior).

The ability to achieve cooling by compressing and expanding a gaseous refrigerant may depend to some degree on the level of liquid refrigerant present in the system. In an automobile air conditioning system, several factors may adversely affect the level of refrigerant in the system. For example, the system may be subject to significant swings in temperature and frequent thermal cycling due to the action of the air conditioner itself and the heat produced by the automobile's engine. Under these conditions, joints and fittings may tend to expand and contract, permitting refrigerant to slowly leak out of the system. In another example, the hoses used may be slightly permeable to the refrigerant, which may also permit the refrigerant to slowly leak out of the hoses. Accordingly, maintenance of an automobile air conditioning system may require monitoring the refrigerant level or pressure and periodic re-charging of the refrigerant as indicated.

Typical automotive air conditioners are provided with at least one service port to allow for the addition of refrigerant and checking on the level of refrigerant in the system. The check of refrigerant level and the addition of refrigerant may be attended to by a professional mechanic, however, there is no requirement that a professional carry out these functions. A growing number of automobile owners choose to perform this type of routine maintenance on their vehicles. This market is commonly referred to as the "do-it-yourself" market.

A standard tool used by professionals for servicing automobile air conditioners includes a set of manifold gauges. A manifold gauge set usually includes three hoses and two gauges: one hose connects to a low pressure service port; one hose connects to a high pressure service port; and the third hose connects to the source of refrigerant. The two gauges may be used to measure the pressure at the high and low pressure service ports.

Although manifold gauges are the standard tool used by professional auto mechanics for air conditioner service, several disadvantages may reduce their popularity among do-it-yourself consumers. Manifold gauges can be complicated to use. One must know the approximate ambient temperature and look up the pressure readings of the gauges on a chart to determine if there is sufficient refrigerant in the system. In addition, use of manifold gauges may be dangerous. Because manifold gauges require handling of the high pressure service port of the automobile air conditioner, their use may present a risk of injury to inexperienced consumers. Furthermore, manifold gauges may be relatively expensive for a "do-it yourself" consumer considering the relative infrequency of their use for servicing of a single automobile. Accordingly, there is a need for new methods and apparatus for servicing air conditioners, such as those used in automobiles, which do not have the same drawbacks as manifold gauges.

U.S. Pat. No. 7,260,943 to Carrubba et al. and U.S. Patent Application Publication Nos. 2008-0022701 to Carrubba et al. and 2009-0113901 to Carrubba et al., which are incorporated herein by reference as fully set forth herein, describe various apparatus that may allow a consumer to measure the refrigerant pressure in an automobile air conditioner and to add refrigerant as needed.

The flow of refrigerant from the refrigerant source is typically regulated via a valve. In the case of an aerosol can of refrigerant, a valve is often threaded or otherwise attached to an outlet at a top end of the container. In some instances, the valve includes a piercing plunger that is advanced to pierce a hole in a seal over an outlet of the can, thereby allowing the pressurized refrigerant to be expelled from the container into the valve. In certain aerosol systems, an integrated valve (for example, a self sealing valve (SSV)) is provided at an outlet of the container. In some aerosol systems, the integrated valve may include a spring-loaded plunger that is depressed to open and close the container. To stop the flow of fluid, the plunger is released, closing the self-sealing valve and/or integrated valve, thereby stopping or reducing the flow of fluid.

Many types of valve are used with automotive refrigerant sources. As regulations change, however, it is believed that use of self-sealing valves may become more common in many, if not all, types of refrigeration products. Accordingly, there is a need for devices that are able to be used with containers (for example, refrigeration containers) equipped with self-sealing valves and/or penetrable seals.

SUMMARY

Various embodiments of apparatus for servicing a refrigeration system, and methods of operating the same are described herein. In some embodiments, an apparatus for servicing a refrigeration system includes an outer housing, a central body, and an actuator. The central body is disposed within the outer housing and includes an internal bore; a first fluid port, a second fluid port, a third fluid port, and a valve. The first fluid port may be fluid communication with the internal bore and a refrigeration system. The second fluid port may be in fluid communication with the internal bore and a measuring device. The third fluid port may be in fluid communication with the internal bore and a refrigerant supply. The valve is disposed in the internal bore. A portion of the valve may be engageable with a self-sealing valve of the refrigerant supply. The actuator operatively connected to the outer housing and the plunger, wherein, during use, the actuator actuates the plunger to move to a first position that allows fluid to communicate between the third fluid port and the first fluid port, and substantially inhibits fluid communication between the refrigeration system and the measuring device or a second position such that the first fluid port communicates with the second fluid port.

In some embodiments, an apparatus for servicing a refrigeration system includes a means for selectively switching between providing communication between a) the refrigeration system and a measuring device coupled to the valve, and b) communication between the refrigeration system and a refrigerant supply coupled to the valve. The refrigerant supply includes a self-sealing valve, and the means is engagable with the self-sealing valve.

In some embodiments, a method of servicing a refrigeration system includes providing an apparatus to a measuring device and a refrigerant system; advancing a valve of the apparatus such that a first end of the valve at least partially opens a self-sealing valve of a refrigerant source while a second end of the valve inhibits communication between the refrigeration source and the measuring device and/or the refrigerant system and the measuring device; and allowing fluid to flow from the refrigerant source to the refrigerant system.

In some embodiments, a system for servicing an automobile air conditioner system includes a refrigerant supply source and a device coupable to the refrigerant supply. The refrigerant supply source includes a self-sealing valve capable of being moved to an opened position or a closed position. The device including a first outlet coupable to the refrigeration system; a second outlet coupable to a measuring device; a third outlet coupable to the refrigerant supply; a passage disposed in a body of the device, wherein the passage communicates with the inlet, the first outlet, and the second outlet; and a valve disposed in the passage, a first portion the valve being engagable with the self-sealing valve of the refrigerant supply and a second portion of valve being engagable with the passage such that engagement of the first portion of the valve with the self-sealing valve during use regulates flow of the refrigerant from the refrigerant supply source and engagement of the second portion of the valve with the passage allows fluid communication between the first outlet and/or second outlet during use.

In some embodiments, kits that include apparatus and/or devices for servicing refrigeration systems are described herein.

BRIEF DESCRIPTION OF THE DRAWINGS

Advantages of the present invention will become apparent to those skilled in the art with the benefit of the following detailed description and upon reference to the accompanying drawings.

DETAILED DESCRIPTION

As used herein, the singular forms "a", "an" and "the" include plural referents unless the content clearly indicates otherwise. Thus, for example, reference to "a valve" includes a combination of two or more valves. The term "include", and derivations thereof, mean "including, but not limited to". "Coupled" means either a direct connection or an indirect connection (for example, one or more intervening connections) between one or more objects or components. The phrase "directly connected" means a direct connection between objects or components such that the objects or components are connected directly to each other so that the objects or components operate in a "point of use" manner. As used herein, "fluid" refers to a liquid, gas, vapor, or a mixture thereof.

Systems, methods, and apparatus for coupling a refrigerant fluid source having a self-sealing valve and/or integral valve to a refrigerant system are described herein. The apparatus allows the measurement of refrigerant pressure in a refrigeration system and addition of refrigerant as needed to the refrigeration system, while being capable of opening or closing the self-sealing valve of the refrigerant fluid source. In some embodiments, the fluid source includes a self-sealing valve and/or integrated valve. As used herein, self-sealing valve and integrated valve are used interchangeably. In some embodiments, the fluid source is pressurized or under vacuum. For example, a fluid source may be an aerosol/pressurized can having an integrated valve.

In certain embodiments, the apparatus includes a valve or similar mechanism for engaging the self-sealing valve and/or a complementary plunger of an integrated valve of the fluid source to enable fluid to flow from the fluid source. The use of an apparatus having a valve that engages with a self-sealing valve allows the servicing device to be directly coupled to a refrigerant source without the need for an adaptor. When using a conventional servicing device (e.g., servicing devices having a plunger that punctures a seal of a refrigerant supply) adaptors are generally employed to inhibit the piercing valve to penetrate integrated valve of the servicing device.

In some embodiments, the valve of the apparatus is biased to a measuring position and is movable into charging position. Moving the valve to a charging position may engage the self-sealing valve and/or a plunger of an integrated valve into an open position. In certain embodiments, the plunger of the self-sealing valve is moved into the open position by engagement (for example, coupling and/or advancement) of the apparatus onto the fluid source.

Figure 1:
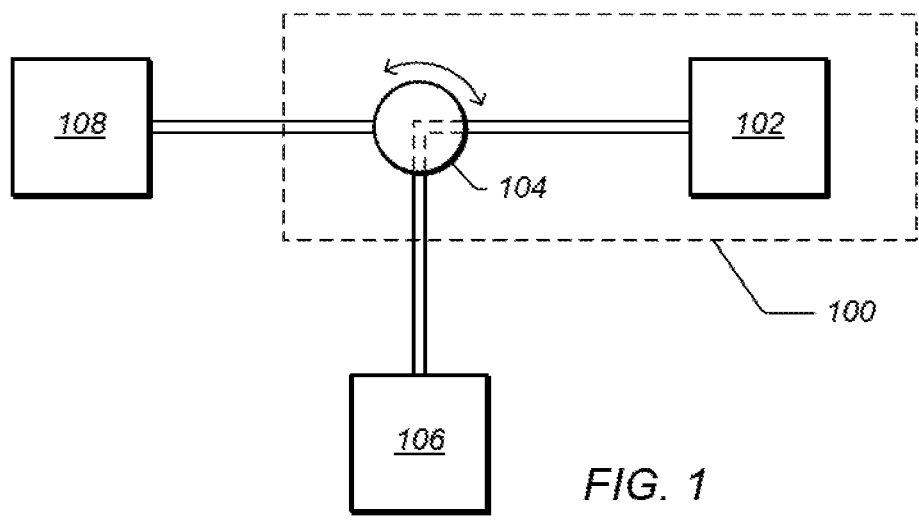
FIG. 1 depicts a schematic of an embodiment of a system for servicing a refrigeration system.
Figure 2:
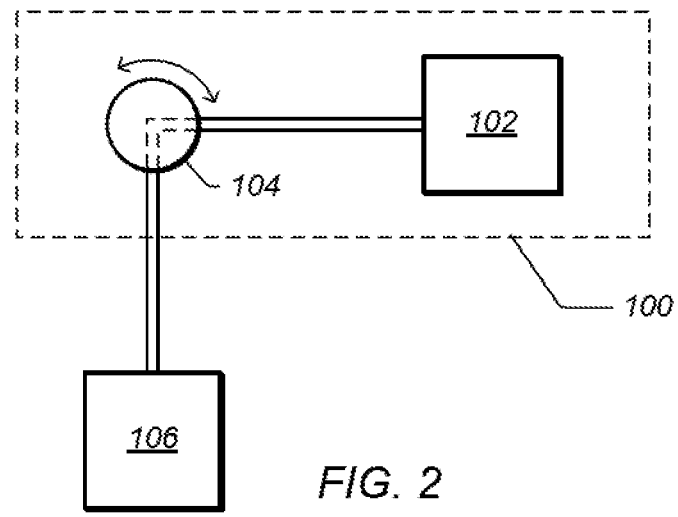
FIG. 2 depicts a schematic of an embodiment of a system for measuring a parameter of a refrigeration system.

FIG. 1 depicts a schematic of an embodiment of a system for servicing a refrigeration system. FIG. 2 depicts a schematic of an embodiment of a system for measuring a parameter of a refrigeration system. Servicing device 100 may include measurement device 102 and switching device 104 for selectively providing communication between receiving system 106, fluid source 108, and the measurement device. Servicing device 100 may be adapted to selectively switch between a charging mode of operation, in which refrigerant from fluid source 108 is provided to receiving system 106, and a measuring mode of operation, in which a parameter of the receiving system is measured by measurement device 102. The depiction of switching device 104 is intended to be illustrative only, and not limiting. Any means for providing the indicated switching may be used in alternative embodiments of the invention.

Receiving system 106 may include, but is not limited to, an automobile refrigerant system, a residential refrigerant system, or a commercial refrigeration system, or the like. In some embodiments, receiving system 106 is an automobile refrigerant system. The automobile refrigerant system may include an automobile air-conditioning (A/C) system. In some embodiments, a refrigeration system may include an evaporator, condenser, and compressor that circulates refrigerant to cool or otherwise transfer/remove heat from the respective environment.

Adding of fluid to receiving system 106 may charge or recharge the unit. As used herein "charging" refers to both charging and recharging of a system. Charging a system may include initially filling a unit with fluid. Recharging may refer to adding fluid to a unit that has some fluid in the unit. Recharging may be performed after a portion of the fluid has leaked out of the unit or the pressure/amount of the fluid has dropped below a desirable level. It will be appreciated that charging and recharging are often used interchangeably. In some embodiments, servicing device 100 is used to charge or recharge a refrigeration system (for example, charging an automobile refrigeration system using a can of refrigerant).

Fluid source 108 includes a source of fluid suitable for use in receiving system 106. Fluid source 108 may include a volume of hydrocarbons, halogenated hydrocarbons, or mixtures thereof. In some embodiments, fluid source may include ammonia and/or water. Halogenated hydrocarbons include, but are not limited to, fluorinated hydrocarbons, chlorinated, fluorinated hydrocarbons, fluorinated ethers, 2,3,3,3-tetrafluorprop-1-ene (HFO-1234yf), 1,1,1,2-tetrafluorethane, dichlorodifluoromethane, or mixtures thereof. Commercially available fluid sources include, but are not limited to, HFO-1234yf refrigerants (for example, Genetron® (Honeywell, USA), Opteon™ (DuPont™, USA), R-134a, R-12, or the like. In some embodiments, fluid source 108 may also include other suitable chemicals including, but not limited to, dyes and/or system lubricants.

Fluid source 108 may be any suitable shape or size and/or may be composed of one or more suitable materials. Fluid source 108 may have a shape that is easily grasped by a human hand, sufficient size to contain a desired volume of fluid; and/or may be composed of a material having sufficient mechanical properties to withstand the static force of a pressurized fluid.

In certain embodiments, fluid source 108 is a portable container. A portable container includes, but is not limited to, a can, a cylinder, or a reservoir that may be easily handled by a user. In some embodiments, fluid source 108 includes, but is not limited to, a stationary reservoir, such as a large tank or similar container. Fluid source 108 may be pressurized or, in some embodiments, under a vacuum. In some embodiments, fluid source 108 is at atmospheric pressure. In an embodiment, fluid source 108 is an aerosol container of R-134a refrigerant or HFO1234fy refrigerant. Fluid source 108 may include an integrated valve.

Servicing device 100 may be used to determine the level of refrigerant in receiving system 106, and/or add refrigerant to the receiving system from fluid source 108. As shown in FIG. 1, use of servicing device 100 may be initiated by connecting the servicing device to receiving system 106 and fluid source 108. Switching device 104 may be oriented to provide communication between measurement device 102 and receiving system 106. Measurement device 102 may display one or more parameters of receiving system 106. Switching device 104 may then be oriented to provide communication between receiving system 106 and fluid source 108 to charge the receiving system.

As shown in FIG. 2, servicing device 100 may be used to determine the level of refrigerant in receiving system 106 without being attached to fluid source 108. Servicing device 100 may be removably connected to receiving system 106. In some embodiments, servicing device 100 is permanently connected to receiving system 106. Switching device 104 may be oriented to provide communication between measurement device 102 and receiving system 106 to display one or more parameters of receiving system 106. Servicing device 100 may be adapted to inhibit fluid from communicating to a port that connects to fluid source 108.

In some embodiments, measurement device 102 indicates a pressure level of receiving system 106. For example, a pressure of receiving system 106 may be read to determine whether or not additional refrigerant should be added to the system. If the addition of refrigerant is needed, switching device 104 may be oriented to allow communication between receiving system 106 and fluid source 108. When switching device 104 is so oriented, refrigerant flows from fluid source 108 to receiving system 106 and communication between receiving system 106 and measurement device 102 may be substantially inhibited. When communication between receiving system 106 and measurement device 102 is inhibited or substantially inhibited, the measurement device may display or indicate a zero or substantially zero value. Orientation of switching device 104 may be changed as desired to alternate between providing refrigerant to the receiving system and checking the pressure of the receiving system.

In some embodiments, fluid source 108 includes an integrated valve having a gating device. A gating device may include a biased plunger that is movable between an open position (for example, where refrigerant is allowed to exit the fluid source container) and a closed position (for example, where refrigerant is inhibited from exiting the fluid source container). Such an integrated valve may be manipulated to the closed position, the open position, or any position there between to regulate the flow rate and/or pressure of refrigerant being expelled from fluid source 108.

Figure 3:
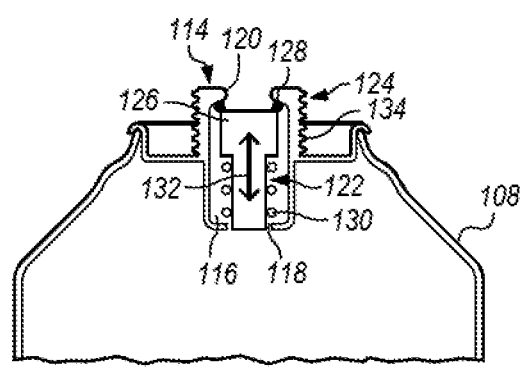
FIG. 3 depicts a cut away side view of an embodiment of a fluid source.

FIG. 3 is a cut away side view of fluid source 108. Fluid source 108 may include fluid source port 114. Fluid source port 114 may function as an inlet and/or an outlet. For example, fluid source port 114 may allow fluid to enter and/or exit fluid source 108. Fluid source port 114 may include bore 116, opening 118, annular lip 120, integrated valve 122, and coupling element 124. Bore 116 may be any suitable shape or size. For example, bore 116 may be at least of sufficient size to receive integrated valve 122. Opening 118 may be any suitable shape or size. For example, opening 118 may be at least of sufficient size to allow pressurized fluid to enter and/or exit fluid source 108 at a desired rate of flow.

Integrated valve 122 may be disposed in bore 116. Integrated valve 122 may be adjustable between an opened position (as referenced herein, an opened position includes any position in which a fluid is allowed to exit or enter fluid source 108) and a closed position (as referenced herein, a closed position includes any position in which a fluid is inhibited from exiting or entering fluid source 108). Integrated valve 122 may be adjusted between the closed position and the opened position to regulate the flow and/or pressure of fluid being transferred to or from fluid source 108.

In some embodiments, integrated valve 122 is a self-sealing valve. In some embodiments, integrated valve 122 includes gating device 126, sealing members 128, and bias member 130. The position of gating device 126 may be manipulated to adjust integrated valve 122 between an opened position and a closed position. For example, gating device 126 may be translated longitudinally as shown by arrow 132. Bias member 130 may urge gating device 126 longitudinally towards annular lip 120. In some embodiments, bias member 130 includes a coiled spring. Gating device 126 may be engaged and/or manipulated by an external device. For example, gating device 126 may be engaged and/or manipulated by a plunger of servicing device 100. In some embodiments, gating device 126 and the external device have complimentary dimensions. Sealing member 128 may be coupled to gating device 126. Integrated valve 122 may be in a closed position when sealing member 128 is pressed against an inside surface of annular lip 120. Sealing member 128 may seal against the inside surface of annular lip 120 such that the unintentional release of fluid from the interior of fluid source is inhibited. Integrated valve 122 may be adjusted to an opened position from the closed position when gating device 126 is translated longitudinally away from annular lip 120. Translating gating device 126 away from annular lip 120 may allow fluid to flow from the interior of fluid source through bore 116 of fluid source port 114.

Fluid source port 114 may couple to servicing device 100. In some embodiments, an adapter may be used to couple fluid source 108 to servicing device 100. Fluid source port 114 may couple to a fluid port of servicing device 100. In some embodiments, the coupling between fluid source port 114 and the fluid port of servicing device 100 is at least substantially fluid tight. That is, little or no fluid may be allowed to escape through the coupling of fluid source port 114 and the fluid port servicing device 100. Fluid source port 114 may be permanently or removably coupled to a fluid port of servicing device 100. Coupling element 124 may be configured to couple fluid source 108 to an external device or structure. As shown in FIG. 3, coupling element 124 includes exterior threads 134 arranged in a selected thread pattern. In some embodiments, a selected thread pattern includes a universal ACME or ISO metric thread pattern engageable with any object or structure having a similar universal thread pattern. For example, a selected thread pattern may include a ½ inch (about 1.27 cm) ACME internal thread or an ISO metric trapezoidal thread having a 30° thread angle. In certain other embodiments, a selected thread pattern includes a unique thread pattern engageable only with selected objects or structures having the unique thread pattern. In some embodiments, exterior threads 134 may be arranged in a unique thread pattern engageable only with the interior threads of one or more components of servicing device 100. In some embodiments, coupling element 124 is at least substantially complementary to a coupling element of servicing device 100. For example, exterior threads 134 may be at least substantially complementary to a set of interior threads of servicing device 100.

Figure 4:
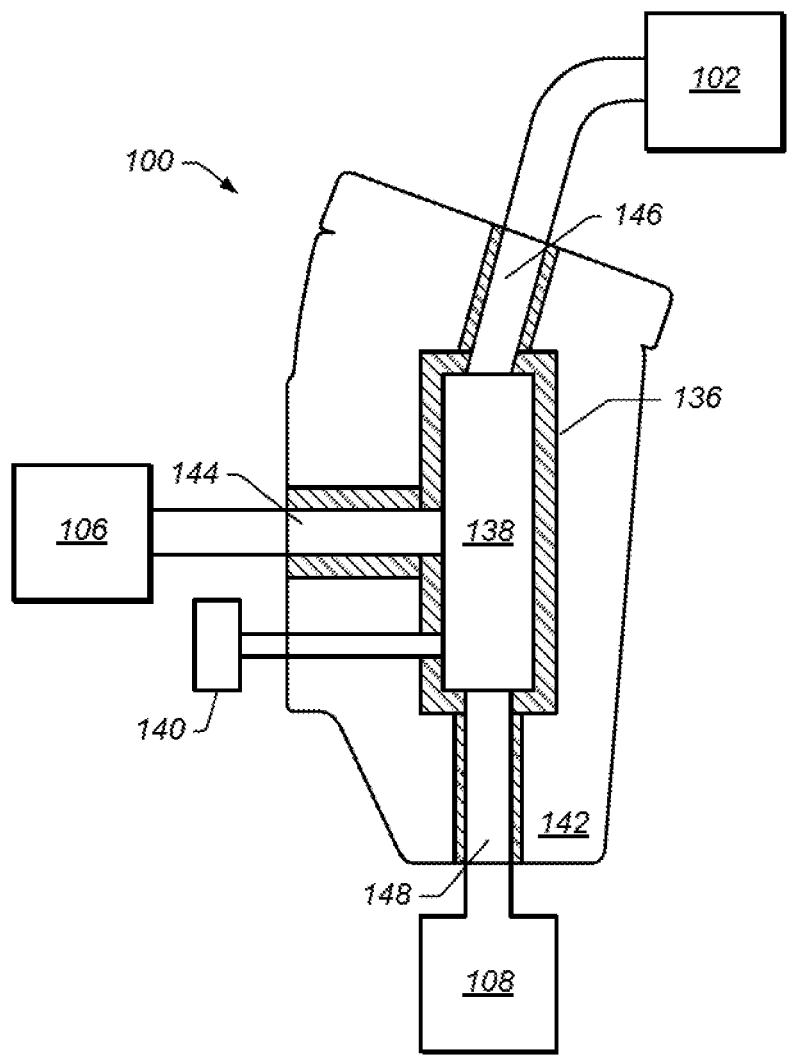
FIG. 4 depicts a schematic of an embodiment of a system for servicing a refrigeration system that includes a refrigeration system servicing device and fluid source.
Figure 5:
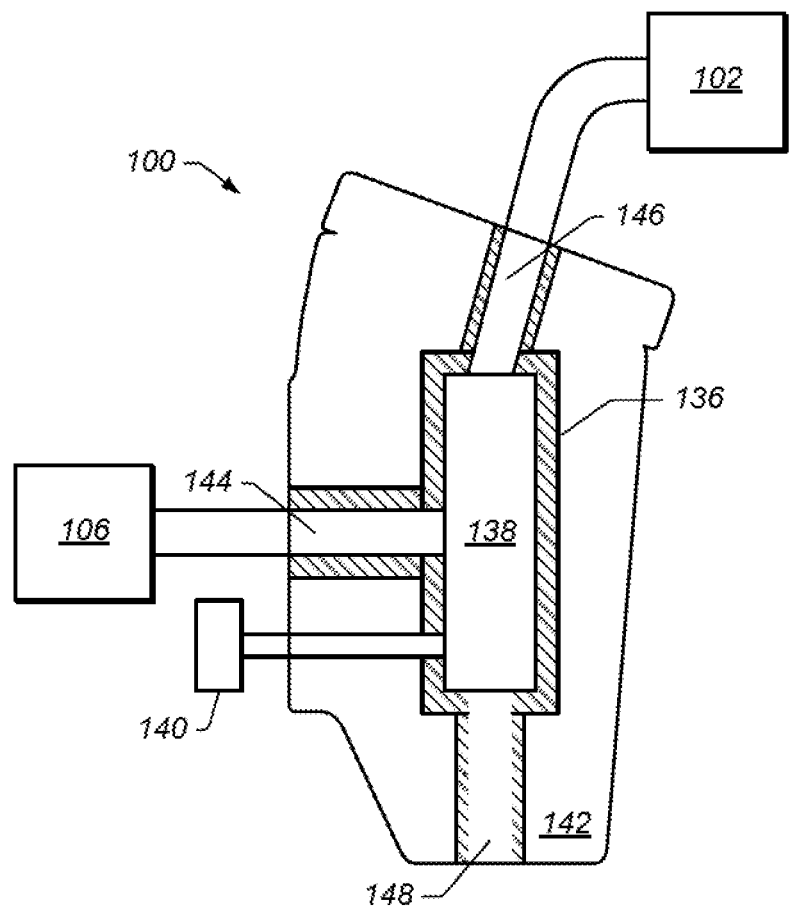
FIG. 5 depicts a schematic of an embodiment of a system for measuring a parameter of a refrigeration system using a refrigeration system servicing device.

FIGS. 4 and 5 depict schematics of embodiments of systems for servicing a receiving system that includes an embodiment of a servicing device. FIG. 4 depicts a schematic of an embodiment of servicing device 100 connected to receiving system 106, fluid source 108 and measuring device 102. FIG. 5 depicts a schematic of an embodiment of servicing device 100 connected to receiving system 106 and measuring device 102. Servicing device 100 may include a central body 136, valve 138, valve actuator 140, and housing 142. Central body 136 may include or communicate with first fluid port 144, second fluid port 146, and third fluid port 148. Valve 138 may be adapted to provide selective communication between (a) the first fluid port 144 and the second fluid port 146, and (b) the first fluid port and third fluid port 148, in response to an actuation of valve actuator 140. Valve 138 shown in FIGS. 4 and 5 may carry out the function of the switching device 104 shown in FIGS. 1 and 2. First fluid port 144 may be adapted to connect to receiving system 106, second fluid port 146 may be connected to measurement device 102, and third fluid port 148 may be adapted to connect to fluid source 108. Valve 138 may be adapted such that selective communication between the first fluid port 144 and third fluid port 148 while inhibiting communication to the third fluid port 148. Thus, servicing device may be used for measuring one or more parameter of the receiving device without being connected to a fluid source.

Figure 6:
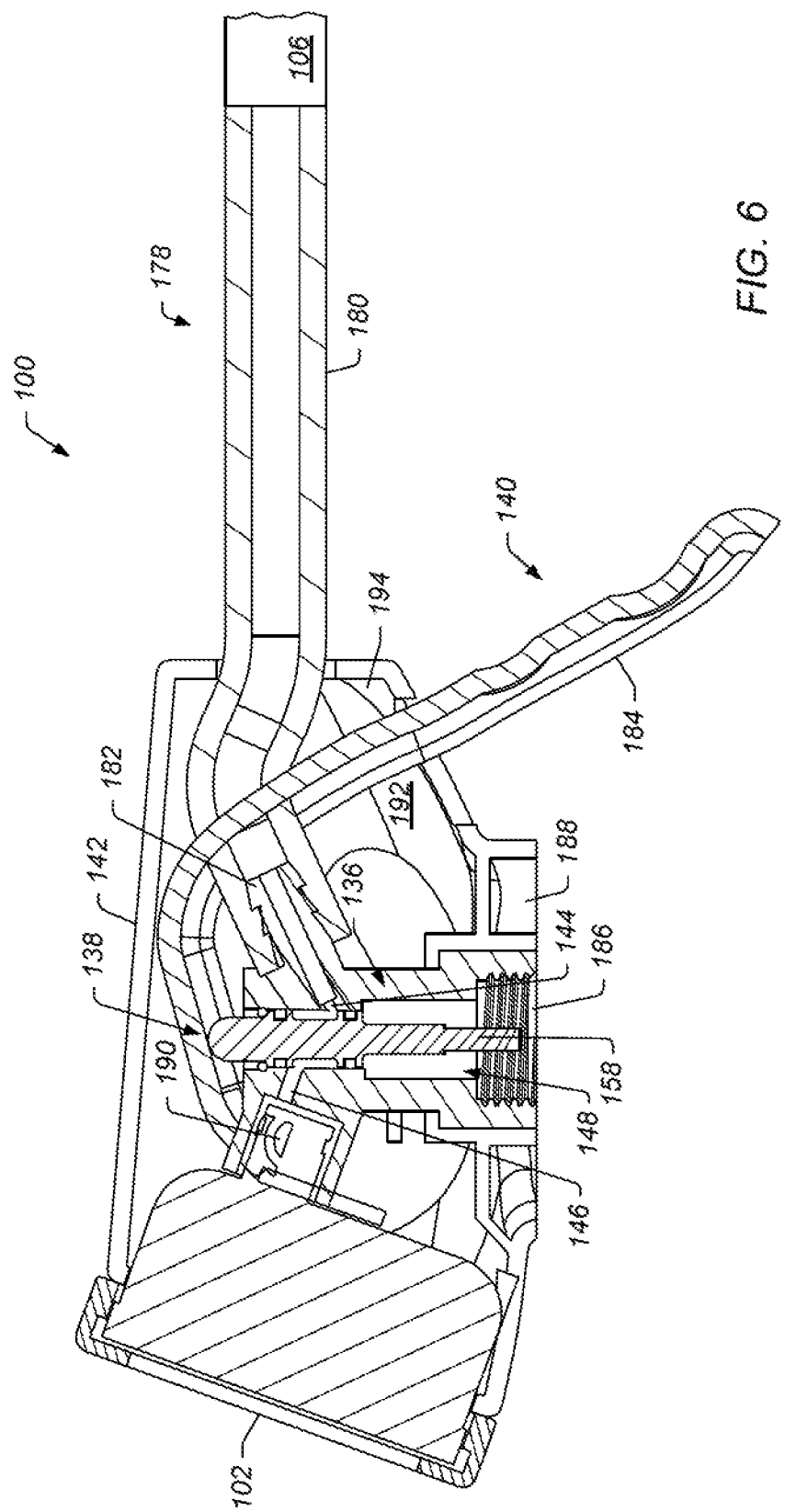
FIG. 6 depicts a cross-sectional view of an embodiment of refrigeration system servicing device in a measuring mode.
Figure 11:
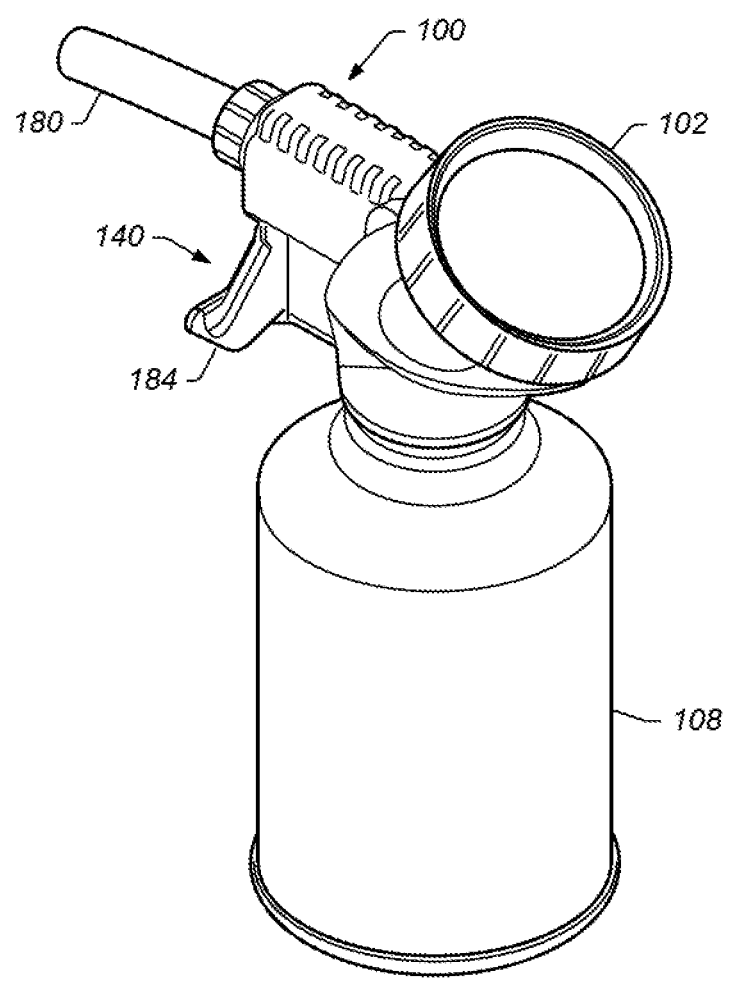
FIG. 11 depicts a perspective view of an embodiment of a refrigeration system servicing device attached to a fluid source.

In some embodiments, measurement device 102 is incorporated into housing 142 (for example, as shown in FIGS. 6 and 11). In some embodiments, measurement device 102 is a pressure gauge used to measure the pressure of the refrigerant in receiving system 106. It is contemplated that the measurement device 102 may be adapted to measure other suitable parameters of the receiving system 106.

In some embodiments, measurement device 102 is a pressure gauge that includes Bourdon pressure tube. The pressure gauge apparatus may include a pressure scale, a pressure indicator, and indices that indicate if the amount of refrigerant in the refrigerant service unit.

Figure 7:
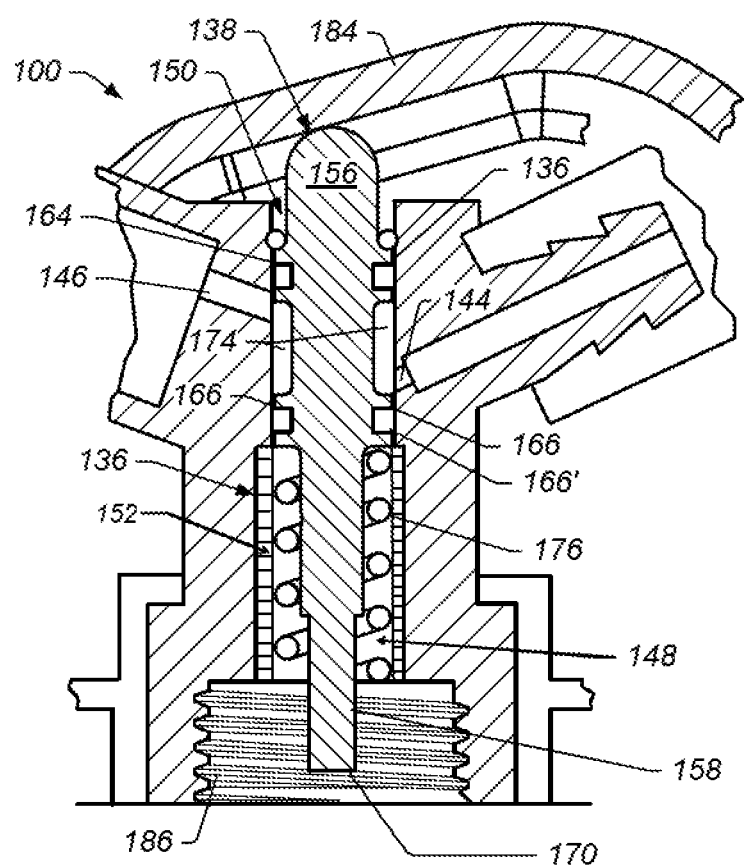
FIG. 7 depicts a cut-away cross-sectional view of an embodiment of a refrigeration system servicing device in a measuring mode of operation.
Figure 8:
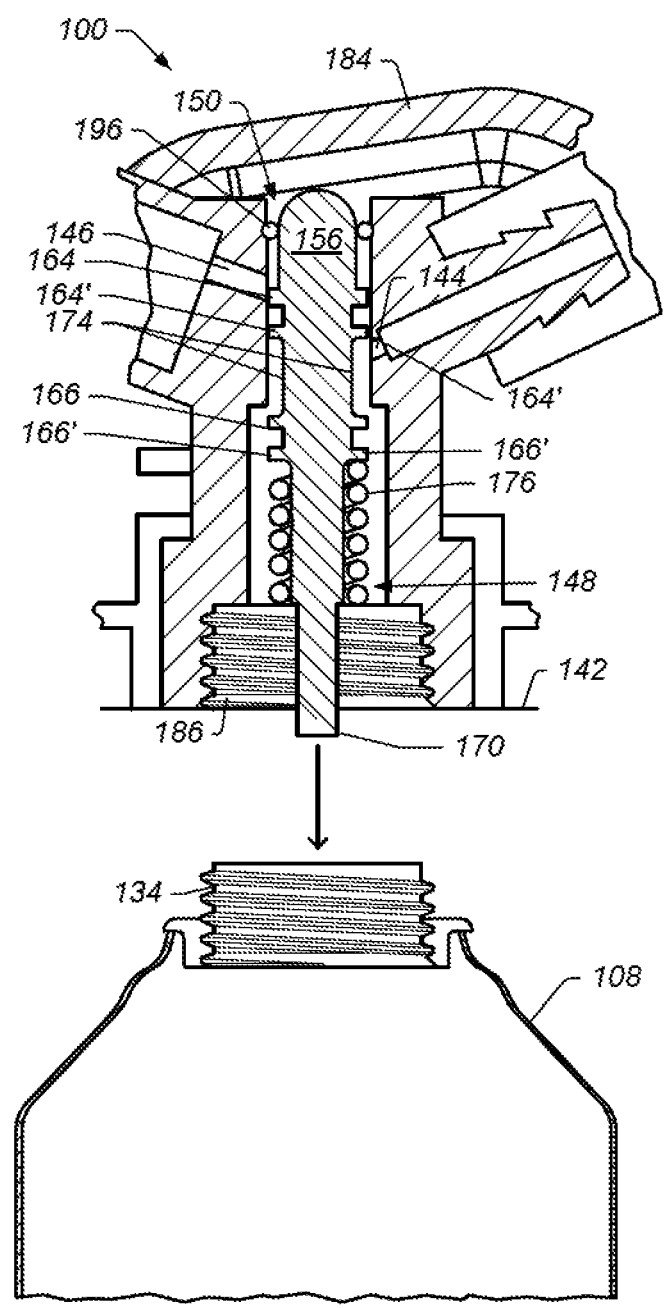
FIG. 8 depicts a cross-sectional expanded view of an embodiment of a refrigeration system servicing device in a charging mode of operation.

In some embodiments, servicing device 100 may be used to determine the level of refrigerant in the receiving system 106 and/or add refrigerant to the receiving system from the fluid source 108. FIGS. 6-8 depict cross-sectional views of embodiments of servicing device 100. FIG. 6 depicts a cross-sectional view of an embodiment of servicing device 100 in a measuring mode. FIG. 7 depicts a cut-away cross-sectional view of an embodiment of a valve portion of servicing device 100 in a measuring mode of operation. FIG. 8 depicts a cross-sectional view of an embodiment of a valve portion of servicing device 100 in a charging mode of operation.

Figure 9:
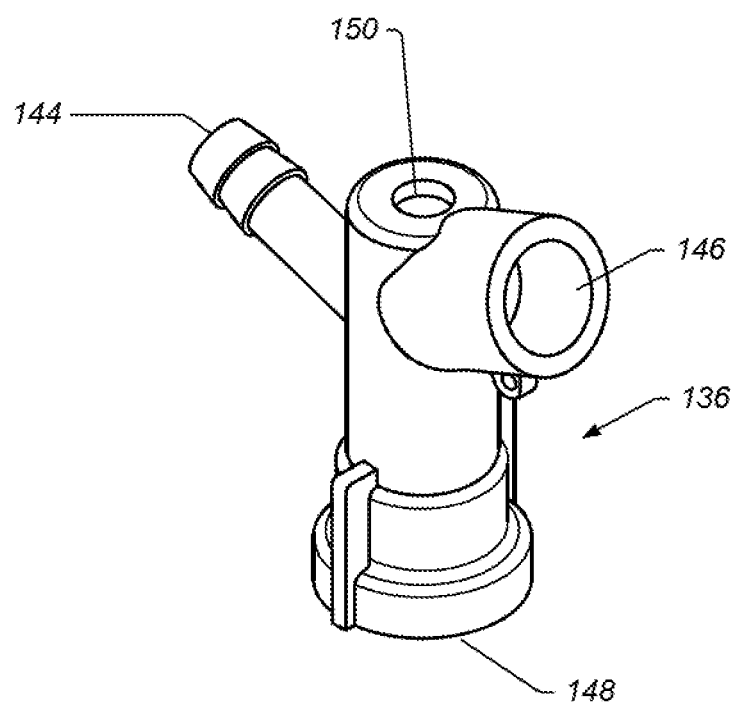
FIG. 9 depicts a perspective view of an embodiment of a central body of a refrigeration system servicing device.

Servicing device 100 may include central body 136, valve 138, valve actuator 140, and housing 142. FIG. 9 depicts an embodiment of a central body. Central body 136 may include first fluid port 144, second fluid port 146, third fluid port 148, and passage 150 (inner bore). First fluid port 144 may be adapted to connect to fluid receiving system 106, second fluid port 146 may be connected to a measurement device 102, and third fluid port 148 may be adapted to connect to fluid source 108 (as shown in FIGS. 6-8 and 11).

Central body 136 may be formed of material compatible with the fluid source. For example, central body may be 136 formed of metal, polymeric material and/or combinations thereof. In some embodiments, central body 136 is formed from polymers and molded. Central body may be inserted into housing 142. Central body may be secured in housing 142 by snap fitting, epoxying, or other known methods.

Valve 138 may be slidably disposed in passage 150 of central body 136. Valve 138 may allow selective communication between first fluid port 144 and second fluid port 146, and the first port and third fluid port 148, in response to an actuation of the valve actuator 140. Valve 138 may be adapted to engage a self-sealing valve and/or a complementary plunger of an integrated valve of the fluid source to enable fluid to flow from the fluid source.

Figure 10:
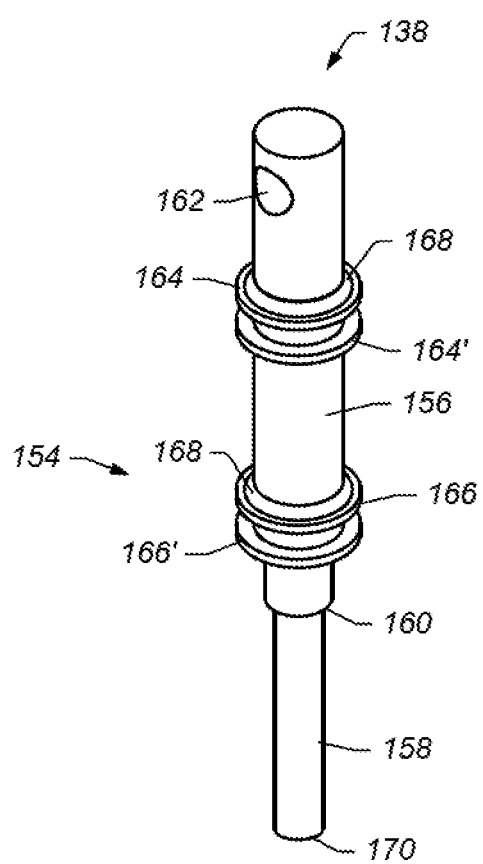
FIG. 10 depicts a perspective view of an embodiment of a valve of a refrigeration system servicing device.

FIG. 10 depicts an embodiment of a valve that is capable of opening an integrated valve of a fluid source. Valve 138 may include body 154. Body 154 may include upper body portion 156 and plunger portion 158. Upper body portion 156 may have an outside diameter that is greater than the outside diameter of plunger portion 158. In some embodiments, the outside diameter of upper body portion 156 ranges from 0.15 to 0.25 inches and the outside diameter of plunger portion 158 ranges from about 0.05 to about 0.13 inches. The outside diameter of upper body portion 156 may be about 30% to about 55% greater than the outside diameter of plunger portion 158. In some embodiments, a ratio of outside diameter of upper body portion 156 to the diameter of plunger portion 158 ranges from 1.5 to 2.0. In some embodiments, upper body portion 156 and plunger portion 158 may be formed integrally. For example, upper body portion 156 and plunger portion 158 may be provided as one piece. In some embodiments, plunger portion 158 may be press-fitted, welded, soldered, or glued to upper body portion 156.

Abutment of plunger portion 158 with upper body portion 156 may form stop 160. In some embodiments, stop 160 is a separate section that directly couples upper body portion 156 to plunger portion 158. For example, stop 160 may be press-fitted, welded, soldered or glued to upper body portion 156 and to plunger portion 158. In some embodiments upper body portion 156 and/or plunger portion 158 may insert into stop 160. In some embodiments, upper body portion 156, plunger portion 158, and stop 160 are formed integrally. An outer diameter of stop 160 may be between the outer diameter of upper body portion 156 and plunger portion 158. An outer diameter of stop may range from about 0.09 inches to 0.17 inches.

In some embodiments, the position of stop 160 allows the stop to contact fluid annular lip 120 of integrated valve 122 (shown in FIG. 3) when the plunger portion 158 is fully extended into the integrated valve. Contact of stop 160 with fluid annular lip 120 may fully open integrated valve 122 and allow passage of fluid from the fluid source 108 through servicing device 100, and then to receiving system 106.

Upper body portion 156 may include opening 162, upper rings 164, 164' and lower rings 166, 166'. Opening 162 may allow valve 138 to be attached to valve actuator 140. Valve 138 may be attached to valve actuator 140 or another part of servicing device 100 using a pin, rivet, or other known attachment means.

Outer diameters of upper rings 164, 164' and lower rings 166, 166' may be greater than the outer diameter of upper body portion 156. Upper ring 164 and lower ring 166' may allow valve 138 to provide selective communication between (a) first fluid port 144 and second fluid port 146, and (b) the first fluid port and third fluid port 148, in response to an actuation of the valve actuator 140 of servicing device 100 as shown in FIG. 6. In some embodiments, ring 166' is positioned proximate an upper portion of stop 160 or is in integral part of the stop. In certain embodiments, upper body portion 156 includes at least two rings, at least four rings, or more.

Sealing members 168 may be positioned adjacent to upper ring 164 and lower ring 166. Sealing members 168 may substantially prevent communication between second fluid port 146 and either of first fluid port 144 or third fluid port 148. In some embodiments, sealing members 168 are positioned between upper ring 164 and upper ring 164' and between lower ring 166 and lower ring 166'. In some embodiments, sealing members 168 may be positioned under lower ring 166' and upper ring 164'. Valve 138 may include as many sealing members as needed.

Referring to FIG. 10, plunger portion 158 includes end 170. Plunger end 170 includes a smooth, rounded or blunt shape capable of engaging and moving the components of the self-sealing valve of fluid source 108. Plunger end 170 may be complementary to a gating device of the fluid supply source such that the engagement end engages the gating device without damaging the plunger (for example, without piercing or scratching a surface of the self-sealing valve). Plunger end 170 may be complementary to a gating device of the fluid supply source such that the engagement end engages the gating device without damaging the plunger (for example, without piercing or scratching a surface of the self-sealing valve). Plunger end 170 may include a substantially flat surface having a chamfered edge. In some embodiments, plunger end 170 includes a completely flat surface, curved surface (for example, hemispherical surface), or the like.

Referring to FIGS. 6 and 7, valve 138 may be positioned in passage 150. Annulus 174 may be formed between an inner wall of central body 136 and upper body portion 156. As valve 138 is moved in passage 150, annulus 174 may align with first fluid port 144, second fluid port 146, and/or third fluid port 148. Aligning annulus 174 with first fluid port 144, second fluid port 146, and/or third fluid port 148 may allow selective fluid communication between portions of passage 150 with selective ports. One or more rings 164, 164', 166, 166' and/or sealing members 168 (not shown) may selectively inhibit communication between passage 150 with first fluid port 144, second fluid port 146, and third fluid port 148. In some embodiments, a diameter of a portion of passage 150 that aligns with first fluid port 144, second fluid port 146 may be less than a diameter of a portion of the passage that aligns with third fluid port 148. In some embodiments, a diameter of a portion of passage 150 that aligns with first fluid port 144, second fluid port 146 may be greater than a diameter of a portion of the passage that aligns with third fluid port 148. In some embodiments, a portion of passage 150 is third fluid port 148.

In some embodiments, portions of passage 150 and/or the fluid ports are fluted 152. Fluting 152 of portions of passage 150, first fluid port 144, and/or third fluid port 148 may enhance flow of fluid from the fluid supply to the receiving system. For example, the portion of passage 150 that allows communication between fluid source 108, receiving system 106 and/or first fluid port 144 may be fluted. Fluting 152 of the portion of passage 150 may allow sealing members 168 to transition from portions of the passage that are different in size (for example, moving from a portion of the bore having a larger diameter to portion of the bore having a smaller diameter). Thus, smooth valve operation and gas flow from the fluid source to the receiving system may be achieved.

A portion of valve 138 may be biased within passage 150 in an upward direction by biasing member 176. Biasing member 176 may be a spring or the like. In some embodiments, a portion of valve 138 may be biased upward, away from the self-sealing valve to inhibit the plunger end 170 from engaging with the integrated valve when the servicing device 100 is coupled to fluid source 108.

In some embodiments, servicing device 100 may be coupled to a fluid source. FIG. 11 depicts servicing device 100 coupled to fluid source 108. Referring to FIG. 6, servicing device 100 may include hose assembly 178. Hose assembly 178 may include hose 180 having a first end attached to hose fitting 182 of central body 136 in communication with first port 144. A second end of hose 180 may be provided with a coupler (not shown) adapted to connect to the receiving system 106. In some embodiments, the coupler may comprise a quick-connect coupler adapted to connect to a low pressure service port of an automobile air conditioner.

During use, servicing device 100 may be connected to fluid source 108 by threading a coupling element of the servicing device onto a male thread of the refrigerant supply and to a receiving system 106 (for example, an automobile refrigeration system) by hose 180. During connection of servicing device 100 to fluid source 108 and receiving system 106, handle 184 may remain in an extended position.

Referring to FIG. 6 housing 142 of servicing device 100 may include coupling member 186 and recess 188. Coupling member 186 may couple to central body 136. For example, coupling member 186 may have thread complimentary to threads of central body 136. In some embodiments, coupling member 186 is formed as a part of central body 136. Passage 150 may extend through coupling member 186 to allow plunger 158 to exit servicing device 100 during charging. Coupling member 186 may allow servicing device 100 to be coupled with coupling member 134 of fluid supply 108.

Coupling member 186 may be complimentary to a coupling member on fluid supply 108. For example, coupling member 186 may be a threaded member that is complementary to an ACME thread on a refrigerant can that includes a self-sealing valve and/or an ACME thread on a refrigerant can that includes a penetrable seal. Recess 188 and/or a portion of housing 142 may be adapted to receive the hub of the fluid source container (not shown) and support servicing device 100 on the fluid supply.

Servicing device 100 may include valve actuator 140 for selectively applying an actuating force to valve 138. In some embodiments, valve actuator 140 includes grips, grooves or the like to enhance squeezing or gripping by a user. Valve actuator 140 may include handle 184 pivotally attached to the central body 136 by pin 190. Handle 184 may include blade portion 192 having cam edge 194. Portions of handle 184 may be coupled or directly coupled to valve 138 (for example, welded, screwed, pinned, epoxied. or combinations thereof).

Referring to FIGS. 6-8, servicing device 100 may be used to measure the pressure of the refrigerant in the refrigeration system using measuring device 102 or add refrigerant to the refrigeration system. While handle 184 is released or in an extended (measuring) position (see, for example, FIGS. 6, 7, and 11), servicing device 100 may be used to measure the pressure of the refrigerant in the refrigeration system using measuring device 102. In the measuring position, a value of the measuring device is substantially zero. When handle 184 is extended, valve 138 is biased into its upper position by biasing member 176, and communication between the first fluid port 144 (which is connected to receiving system 106) and second fluid port 146 (which is connected to the measurement device 102) is provided through annulus 174. The ring 166 and/or sealing members 168 (not shown, see FIG. 10) may substantially prevent communication between third fluid port 148 and first fluid port 144 and/or second fluid port 146. For example, communication between a refrigerant can and the measuring devices and/or between the refrigerant system and the atmosphere. As a result, second fluid port 146 experiences pressure similar to the pressure of first fluid port 144, which, in turn, is similar to the internal pressure of the receiving system 106 (for example, automobile refrigeration system). In this manner, measurement device 102 may measure the refrigeration system pressure (or other parameter in alternative embodiments).

A pressure of receiving system 106 may be assessed and the level of refrigerant in the receiving system may be determined. In some embodiments, the measurement device 102 may indicate the need for additional refrigerant, for example, by displaying a measurement reading. If a need for additional refrigerant is determined, servicing device 100 may be used to charge receiving system 106 with fluid from fluid source 108.

Referring to FIG. 8, when charging operation is desired, an actuation force may be applied to valve 138 using handle 184 (for example, squeezing the handle). When handle 184 is squeezed (moved towards receiving system 106 in FIG. 6), cam edge 194 may force a portion of handle 184 downward, overcoming the upward bias of biasing member 176, and moving valve 138 from a first measuring position in passage 150 (shown in FIGS. 6 and 7) to a second charging position (shown in FIG. 8). Movement of the valve 138 downward within passage 150 aligns annulus 174 with first fluid port 144 and third fluid port 148. Pressure in measurement device 102 may vent through opening 196 in central body 136.

In this position, ring 164 and/or sealing member 168 (not shown) may substantially prevent communication between second fluid port 146 and either of first fluid port 144 and/or third fluid port 148. At the same time, annulus 174 allows communication between first fluid port 144 and third fluid port 148. As a result, refrigerant from the refrigerant supply may flow through passage 150, through first fluid port 144, and then to refrigeration system 106.

Depression of valve 138 may engage plunger end 170 with the self-sealing valve (see, for example, FIG. 3) of fluid source 108, and depress the self-sealing valve into an open position. Opening the self-sealing valve may allow fluid (for example, refrigerant) to flow from fluid source 108 through passage 150, to first fluid port 144, and then to receiving system 106 (for example, a refrigeration system). Release of handle 184 may allow valve 138 to return to its measuring position under the influence of biasing member 176. Release of handle 184 may disengage plunger end 170 from the self-sealing valve of fluid source 108. Alternating between providing refrigerant to the refrigeration system and measuring a parameter of the refrigeration system may be performed by applying an actuation force to valve 138 by squeezing handle 184 as desired.

It is contemplated that other suitable means for providing an actuating force to the valve are considered to be within the scope of the present invention. For example, means for actuating the valve with the handle are considered within the scope of the present invention, including, but not limited to, hydraulic, mechanical, or pneumatic members that could be used to link the plunger portion of the valve with the handle.

In addition, the valve actuator may be adapted to receive other actuation forces, such as, for example, pulling, rotating, and/or pushing forces.

It is appreciated that servicing device 100 may be adapted to selectively switch between the charging mode of operation and the measuring mode of operation in alternative ways. For example, it is contemplated that servicing device 100 may be adapted such that an actuation force is applied for measuring operation, and no actuation force is applied to valve 138 for charging operation.

The depiction of the housing, the valve actuator, and the valve are intended to be illustrative only, and not limiting. It is appreciated that the size and shape of the housing may vary markedly without departing from the intended scope of the present invention. These and other modifications to the above-described embodiments of the invention may be made without departing from the intended scope of the invention. It will be apparent to those skilled in the art that various other modifications and variations can be made in the construction, configuration, and/or operation of the present invention without departing from the scope or spirit of the invention.

In some embodiments, the servicing device may be sold and/or packaged as a complete product or as part of a kit. The kit may also include, a fluid source (for example, a can of refrigerant and/or refrigerant containing additives), additional measuring devices (for example, temperature gauge), safety glasses, towels, funnels, an activating light source (for example, an UV light), or combinations thereof. The kit may be packaged in a carrying case with pre-formed segments to hold the components of the kit. In some embodiments, the carrying case may be plastic and/or include a handle. In some embodiments, the pre-formed segments may be removable.

In some embodiments, a refrigerant system is serviced using servicing device 100 described herein. Refrigerant system, in some embodiments, is an automobile air conditioning system. Servicing device may be coupled to refrigerant system using a hose or other suitable conduit to a low pressure side of a refrigerant system. A pressure and/or level of refrigerant of the refrigerant system may be determined. If the refrigerant level is adequate, the servicing device may be disconnected. If the refrigerant level is low, the servicing device may be connected to a fluid source (for example, a can of automobile refrigerant). A handle (actuator) of the service device may be squeezed sufficiently to open the fluid source. Fluid (for example, refrigerant) from the fluid source may flow from the fluid source through the service device and into the refrigerant system. The handle may be released and the pressure and level of refrigerant in the refrigerant system may be determined. The process may be repeated until the level of refrigerant in the refrigerant is adequate. A position of the handle may be varied to regulate the flow of refrigerant from the fluid source to the refrigerant system. Once an adequate level is reached the servicing device may be disconnected from the refrigerant system and then from the fluid source.

In this patent, certain U.S. patents and U.S. patent applications have been incorporated by reference. The text of such U.S. patents and U.S. patent applications is, however, only incorporated by reference to the extent that no conflict exists between such text and the other statements and drawings set forth herein. In the event of such conflict, then any such conflicting text in such incorporated by reference U.S. patents and U.S. patent applications is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An apparatus for servicing a vehicle refrigeration system, comprising:
   an outer housing;
   a central body disposed within the outer housing, the central body comprising:
      an internal bore;
      a first fluid port, the first fluid port being in fluid communication with the internal bore and configured for being in fluid communication with the vehicle refrigeration system;
      a second fluid port, the second fluid port being in fluid communication with the internal bore and a pressure measuring device;
      a third fluid port, the third fluid port being in fluid communication with the internal bore and configured for being in fluid communication with a refrigerant supply;
   a valve disposed in the internal bore, wherein the valve has a top end and a plunger end, the plunger end being engageable with a self-sealing valve of the refrigerant supply; wherein a portion of the valve is biased within the internal bore in an upward direction by a biasing member, away from the self-sealing valve to inhibit the plunger end from engaging with the self-sealing valve when the apparatus is coupled to the refrigerant supply; and
   an actuator comprising a handle pivotally connected to the apparatus, wherein, during use, the handle is adapted to be actuated so that the actuator contacts the top end of the valve and actuates the valve to move to a first position that allows fluid to communicate between the third fluid port and the first fluid port, and substantially inhibits fluid communication between the first fluid port and the pressure measuring device or the handle is adapted to be released so that the biasing member biases the valve upward to a second position such that the first fluid port communicates with the second fluid port.

2. The apparatus of claim 1, wherein the valve of the apparatus, when actuated during use, opens the self-sealing valve.

3. The apparatus of claim 1, wherein the plunger end of the valve is tapered.

4. The apparatus of claim 1, wherein the biasing member comprises a spring.

5. The apparatus of claim 1, wherein the valve comprises one or more sealing members, wherein at least one of the one or more sealing members inhibits flow of fluid from the third fluid port to the pressure measuring device when the valve is actuated to the first position.

6. The apparatus of claim 1, wherein a value of the pressure measuring device is substantially zero when the valve is actuated to the first position.

7. The apparatus of claim 1, wherein the valve comprises at least two rings, wherein an outer diameter of the at least two rings are greater than an outer diameter of a portion of the valve between the two rings, and wherein a distance between the two rings forms an annulus between the valve and the central body.

8. An apparatus for servicing a vehicle refrigeration system, comprising:
- a valve for selectively switching between providing communication between a) the vehicle refrigeration system and a pressure measuring device coupled to the valve, and b) communication between the vehicle refrigeration system and a refrigerant supply coupled to the valve, wherein the refrigerant supply comprises a self-sealing valve, the valve is engageable with the self-sealing valve, and the valve comprises one or more sealing members;
- wherein engaging the valve of the apparatus into the self-sealing valve comprises moving a portion of the valve through a passage of the apparatus;
- wherein the apparatus is configured for being in fluid communication with the vehicle refrigeration system and the refrigerant supply and
- wherein a portion of the valve is biased within the passage in an upward direction by a biasing member, away from the self-sealing valve to inhibit a plunger end from engaging with the self-sealing valve when the apparatus is coupled to the refrigerant supply; and
- wherein an actuator comprising a handle is pivotally connected to the apparatus, wherein, during use, the handle is adapted to be actuated so that the actuator contacts a top end of the valve and actuates the valve to move to allow fluid to communicate between the vehicle refrigeration system and the refrigerant supply.

9. A method of servicing a vehicle refrigeration system, comprising:
- providing an apparatus to a pressure measuring device and the vehicle refrigerant system, wherein the apparatus comprises an actuator comprising a handle that is pivotally connected to the apparatus;
- advancing a valve of the apparatus such that a plunger end of the valve at least partially opens a self-sealing valve of a refrigerant source while the valve inhibits communication between the refrigeration source and the pressure measuring device and/or the vehicle refrigerant system and the pressure measuring device; wherein the valve comprises one or more sealing members; and
- allowing fluid to flow from the refrigerant source to the vehicle refrigerant system;
- wherein engaging the valve of the apparatus into the self-sealing valve comprises moving a portion of the valve through a passage of the apparatus;
- wherein a portion of the valve is biased within the passage in an upward direction by a biasing member, away from the self-sealing valve to inhibit the plunger end from engaging with the self-sealing valve when the apparatus is coupled to the refrigerant source, and
- wherein advancing the valve comprises actuating the handle so that the actuator contacts a top end of the valve and actuates the valve to move to allow fluid to communicate between the vehicle refrigeration system and the refrigerant supply, wherein when the handle is released the biasing member biases the valve upward to allow fluid to communicate between the vehicle refrigeration system and the pressure measuring device.

10. The method of claim 9, wherein allowing fluid to flow comprises regulating the fluid flow by advancing the valve of the apparatus in a direction to at least partially close the self-sealing valve.

11. The method of claim 9, wherein a value of the pressure measuring device is substantially zero when inhibiting fluid flow from the refrigerant source to the pressure measuring device.

12. The method of claim 9, wherein the plunger end comprises a tapered end.

13. The method of claim 9, further comprising determining an amount of refrigerant in the vehicle refrigerant system using the pressure measuring device.

14. A kit servicing a vehicle refrigeration system, comprising;
- a servicing device, the servicing device comprising:
  - a first outlet coupleable to the vehicle refrigerant system;
  - a second outlet coupleable to a pressure measuring device;
  - a third outlet coupleable to a refrigerant source;
  - a passage disposed in a body of the servicing device, wherein the passage communicates with the first outlet, the second outlet, and the third outlet;
  - a valve disposed in the passage, a plunger end of the valve being engageable with a self-sealing valve of the refrigerant source while a portion of the valve inhibits communication between the third outlet and the second outlet and/or the second outlet and the first outlet during use; wherein the valve comprises one or more sealing members; and
  - an actuator comprising a handle pivotally connected to the servicing device,
- wherein a portion of the valve is biased within the passage in an upward direction by a biasing member, away from the self-sealing valve to inhibit the plunger end from engaging with the self-sealing valve when the servicing device is coupled to the refrigerant source, and
- wherein, during use, the handle is adapted to be actuated so that the actuator contacts a top end of the valve and actuates the valve to move and engage the self-sealing valve or the handle is adapted to be released so that the biasing member biases the valve away from the self-sealing valve to inhibit the plunger end from engaging with the self-sealing valve when the servicing device is coupled to the refrigerant source.

15. The kit of claim 14, further comprising a refrigerant container.

16. A system for servicing a vehicle refrigeration system, comprising:
- a refrigerant supply source comprising a self-sealing valve capable of being moved to an opened position or a closed position;
- a servicing device coupleable to the refrigerant supply source, the servicing device comprising
  - a first outlet coupleable to the vehicle refrigeration system;
  - a second outlet coupleable to a pressure measuring device;
  - a third outlet coupleable to the refrigerant supply source;
  - a passage disposed in a body of the servicing device, wherein the passage communicates with the first outlet, the second outlet, and the third outlet;

a valve disposed in the passage, wherein, during use, a plunger end of the valve engages with the self-sealing valve of the refrigerant supply while a portion of the valve inhibits communication between the third outlet and the second outlet and/or between the first outlet and the second outlet; wherein the valve comprises one or more sealing members; and an actuator comprising a handle pivotally connected to the servicing device, wherein engaging the valve into the self-sealing valve comprises moving a portion of the valve through the passage and wherein a portion of the valve is biased within the passage in an upward direction by a biasing member, away from the self-sealing valve to inhibit a plunger end from engaging with the self-sealing valve when the servicing device is coupled to the refrigerant supply, wherein, during use, the handle is adapted to be actuated so that the actuator contacts a top end of the valve and actuates the valve to move and engage the self-sealing valve or the handle is adapted to be released so that the biasing member biases the valve away from the self-sealing valve to inhibit the plunger end from engaging with the self-sealing valve when the servicing device is coupled to the refrigerant supply source.

17. The apparatus of claim 1, wherein the valve is slidably disposed in the internal bore.

18. The apparatus of claim 8, wherein the valve is slidably disposed in the passage.

19. The system of claim 16, wherein the valve is slidably disposed in the passage.

20. The apparatus of claim 1, wherein the first fluid port and the pressure measuring device are located on opposite sides of the central body, wherein the pivotal connection and the pressure measuring device are located on same side of the apparatus, and wherein the handle has a free end that is located on same side of the apparatus as the first fluid port.

21. The apparatus of claim 8, wherein at least a portion of the passage is fluted; wherein fluting of at least the portion of the passage is sufficient to allow the one or more sealing members to transition from portions of the passage that are different in size, and achieve smooth valve operation and gas flow from the refrigerant supply to the vehicle refrigeration system.

* * * * *